United States Patent
Vrabec et al.

(10) Patent No.: US 11,256,817 B2
(45) Date of Patent: Feb. 22, 2022

(54) TOOL FOR GENERATING SECURITY POLICIES FOR CONTAINERS

(71) Applicant: Red Hat, Inc., Raleigh, NC (US)

(72) Inventors: Lukas Vrabec, Nitra (SK); Petr Lautrbach, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 300 days.

(21) Appl. No.: 16/272,707

(22) Filed: Feb. 11, 2019

(65) Prior Publication Data
US 2020/0257810 A1 Aug. 13, 2020

(51) Int. Cl.
G06F 21/00 (2013.01)
G06F 21/60 (2013.01)
H04L 29/06 (2006.01)
G06F 21/53 (2013.01)

(52) U.S. Cl.
CPC ............ *G06F 21/604* (2013.01); *G06F 21/53* (2013.01); *H04L 63/10* (2013.01); *H04L 63/20* (2013.01)

(58) Field of Classification Search
CPC .................. G06F 21/53; G06F 21/604; G06F 2221/2141; H04L 63/10; H04L 63/20
See application file for complete search history.

(56) References Cited

U.S. PATENT DOCUMENTS

| 9,521,115 | B1 | | 12/2016 | Woolward | |
| 10,148,493 | B1 | * | 12/2018 | Ennis, Jr. | G06F 9/541 |
| 10,924,506 | B2 | * | 2/2021 | Ferris | H04L 63/145 |
| 2008/0209501 | A1 | | 8/2008 | Mayer et al. | |
| 2009/0222880 | A1 | | 9/2009 | Mayer et al. | |
| 2017/0264619 | A1 | * | 9/2017 | Narayanaswamy | H04L 63/0281 |
| 2018/0091449 | A1 | * | 3/2018 | Tellez | H04L 67/10 |
| 2018/0218148 | A1 | * | 8/2018 | D'Errico | G06F 21/53 |
| 2019/0182294 | A1 | * | 6/2019 | Rieke | G06F 16/2379 |
| 2020/0106741 | A1 | * | 4/2020 | Fandli | H04L 43/045 |

OTHER PUBLICATIONS

SELinux Wiki, "Policy Language," accessed Nov. 19, 2018, 9 pages, <https://selinuxproject.org/page/PolicyLanguage>.
Andriod Open Source Project, "Building SELinux Policy," accessed Nov. 19, 2018, 9 pages, <https://source.android.com/security/selinux/build>.
"Udica," 4 pages, <https://github.com/containers/udica/blob/master/README.md>.
"Container SELinux Customization," 4 pages, <https://github.com/fedora-selinux/container-selinux-customization>.
"SELinux Common Intermediate Language Motivation and Design," 75 pages, <https://github.com/SELinuxProject/cil/wiki>.

* cited by examiner

*Primary Examiner* — Joseph P Hirl
*Assistant Examiner* — Ka Shan Choy
(74) *Attorney, Agent, or Firm* — Lowenstein Sandler LLP

(57) ABSTRACT

Disclosed are systems and methods for generating security policies for containers. An example method comprises identifying a virtualized execution environment running on a computer system, parsing metadata associated with the virtualized execution environment to identify resources of the computer system to be used by the virtualized execution environment, generating a set of access rules determining access to the resources, creating a security policy in view of the set of access rules, and applying the security policy to the virtualized execution environment.

19 Claims, 9 Drawing Sheets

TOOL FOR GENERATING SECURITY POLICIES FOR CONTAINERS

TECHNICAL FIELD

The present disclosure is generally related to computer systems, and more particularly, to computer system security policies.

BACKGROUND

A container may be an isolated set of resources allocated to executing an application and/or process independent from other applications and/or processes. A number of containers may execute within the same computer system.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
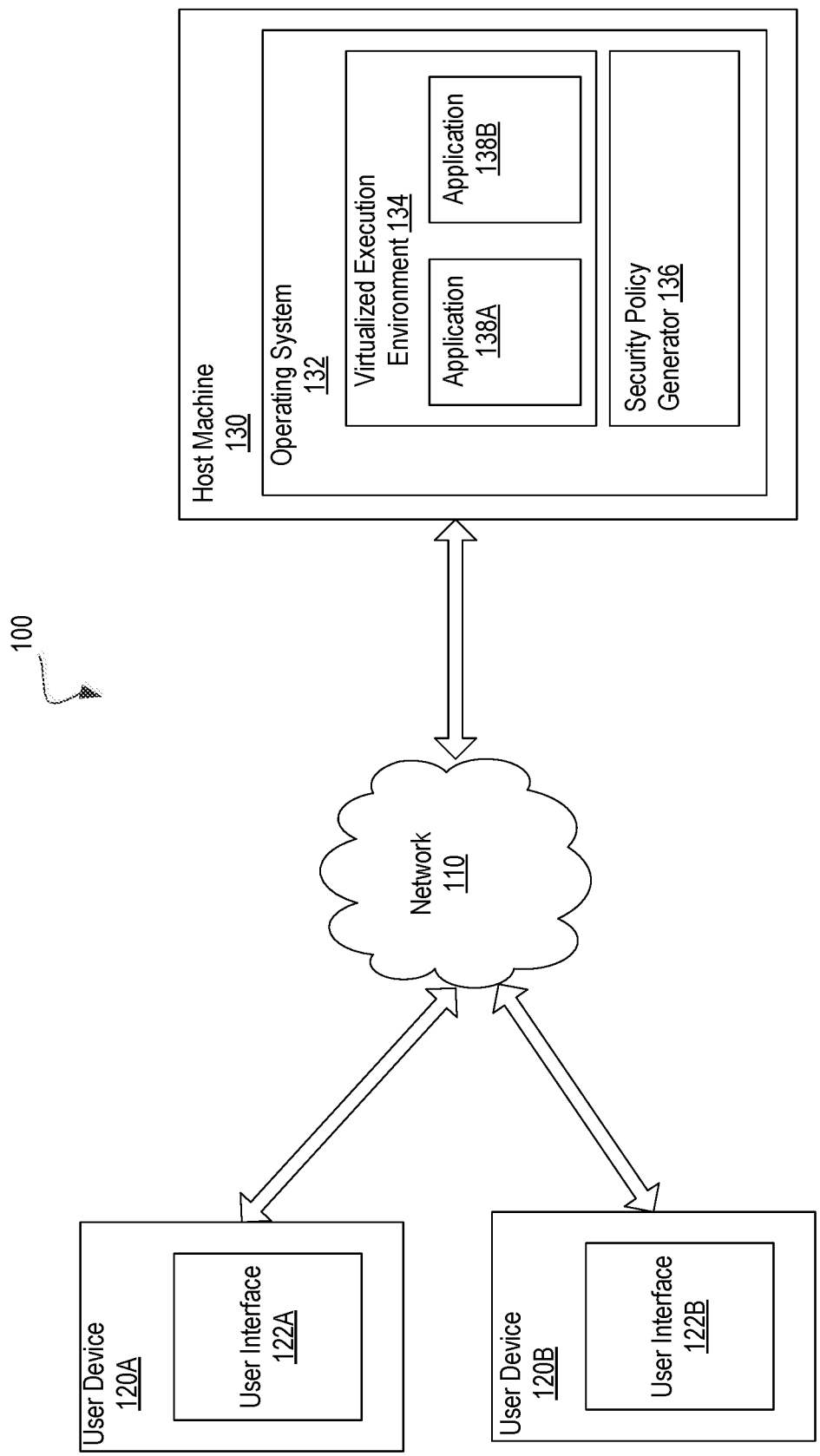
FIG. 1 depicts a system diagram of an example computer system architecture, in accordance with one or more aspects of the disclosure.

Described herein are systems and methods for generating security policies for virtualized execution environments. A virtualized execution environment may refer to a virtual machine, a container, or various other execution environments. A virtualized execution environment may include one or more containers. A container may refer to one or more applications, processes and computing resources that are packaged together and isolated from other applications, processes, or resources of the computer system not allocated to the container. A container may execute applications by using the underlying resources of the operating system on which it is running, in contrast to a virtual machine in which a virtual operating system may be required to execute an application. The applications and processes executing inside a container may only access the resources allocated to the container. Computing resources may be represented by filesystem objects (such as files, directories, and symbolic links), communication endpoints (such as sockets), and/or other resources of the computer system.

Virtualized execution environments, such as containers, may need to be isolated from one another to allow for secure computing within each virtualized execution environment. Therefore, a security policy allowing a virtualized execution environment to access necessary resources while preventing access to other resources should be created for each virtualized execution environment. The security policy may be defined in a mandatory access control (MAC) system within an operating system. A default security policy may be defined and applied to a virtualized execution environment upon creation. To create a unique security policy for the virtualized execution environment, an administrator of the system may need to manually write a security policy in a particular format. However, in certain circumstances, the system administrator may not have the expertise, or the time, to manually create a security policy for the virtualized execution environments of the system.

Aspects of the present disclosure relate to generation of security policies for a virtualized execution environment running in a computer system. A security policy for a virtualized execution environment may determine the resources that the virtualized execution environment can access. For example, a security policy of a virtualized execution environment may allow the applications running in the virtualized execution environment to run one or more processes, and/or access certain filesystem objects, or communication endpoints identified by the security policy (e.g., directories, files, sockets, symlinks, semaphores, etc.). The applications running in the virtualized execution environment will be denied access to any resources other than the resources to which access is explicitly allowed by the security policy.

A security policy generator may generate a security policy for a virtualized execution environment. The security policy generator may parse a metadata file associated with the virtualized execution environment to identify resources likely to be accessed by the virtualized execution environment. The metadata file may include a description of the virtualized execution environment, such as network access data, filesystems the virtualized execution environment is mounting, and/or other information regarding the resources which the virtualized execution environment may be likely to access. The security policy generator may generate a set of access rules that define access to the resources identified as likely to be accessed by the virtualized execution environment. The access rules may also specify the type of access allowed (e.g., read, write, execute, etc.). The generated access rules may form a security policy, which may then be applied to the virtualized execution environment, e.g., by loading the security policy to an operating system kernel which may enforce the security policy.

Aspects of the disclosure may improve the ease and efficiency of creating resource access security policies in a computer system. The systems and methods may allow for automatic creation of individualized security policies for virtualized execution environments. In some aspects of the disclosure, a single command line or an interaction with a user interface may allow for easy generation of a security policy for a virtualized execution environment.

FIG. 1 depicts a high-level system diagram of an illustrative example of a computer system 100, in accordance with one or more aspects of the present disclosure. It should be noted that other architectures for computer system 100 are possible, and that the implementation of a computer system utilizing examples of the disclosure are not necessarily limited to the specific architecture depicted.

The example computer system 100, shown in FIG. 1, may include one or more user devices 120A-B and a host machine 130 connected by a network 110. User devices 120A-B may be a server, a workstation, a personal computer, a mobile phone, a palm-sized computing device, a personal digital assistant, and so on. User devices 120A-B may each include a user interface 122A-B for a user to interact with and control the user devices 120A-B. User device 120A-B may communicate with and control a virtualized execution environment 134 and applications 138A-B running within the virtualized execution environment 134.

Host machine 130 may be a server, a workstation, a personal computer, a mobile phone, a palm-sized computing device, a personal digital assistant, etc. Host machine 110 may include a system comprising one or more processors, one or more memory devices, and one or more input/output interfaces. Host machine 130 may execute an operating system 132, a virtualized execution environment 134, and a security policy generator 136.

Virtualized execution environment 134 may be a virtual machine, a container, or any other virtualized computing resource. Virtualized execution environment 134 may be managed by a hypervisor, or a container engine, executing on operating system 132 of the host machine 130. Host machine 130 may run any number of virtualized execution environments 134. One or more applications 138A-B may be executed within the virtualized execution environment 134. Applications 138A-B may be controlled by user devices 120A-B. Applications 138A-B may be any type of application such as a web application, a desktop application, a browser application, etc.

Security policy generator 136 may generate a security policy for the virtualized execution environment 134. Security policy generator 136 may parse metadata associated with the virtualized execution environment 134 to identify resources of the computer system 100 that the virtualized execution environment 134 is likely to access. The metadata may include a description of the resources to be accessed by applications running within the virtualized execution environment 134, such as identifiers of communication endpoints (including network addresses, protocols, ports, or any combinations thereof), identifiers of filesystems or files, and/or other resources which the virtualized execution environment 134 may be likely to access. The metadata may be included in a JSON file, XML file, any other data exchange language file, etc. A container engine may generate a metadata file comprising the metadata by inspecting the virtualized execution environment 134 to identify information about the virtualized execution environment 134. Security policy generator 136 may generate a set of access rules determining access to the resources that, according to the metadata, the virtualized execution environment 134 is likely to access. The security policy generator 136 may then generate a security policy for the virtualized execution environment 134 to provide access to the identified resources, according to the set of access rules. In one example, the security policy generator 136 may generate the security policy as a script, such as a block in a common intermediate language (CIL). The security policy generator 136 may select one or more predefined CIL blocks that provide access to the identified resources to generate a new block in the CIL that inherits the properties of the selected blocks. The predefined CIL blocks may be blocks that have been previously defined by a system administrator or the security policy generator 136 to provide access to particular resources. Alternatively, the predefined CIL blocks may be included in the security policy generator 136 and/or a kernel of the operating system 132. The properties of the selected blocks may be access rules that are specified by elements of the blocks. The elements of the CIL blocks may comprise one or more SELinux definitions of a type (i.e. process, content, log, etc.), and one or more access rules for the defined types (i.e. which types are allowed access to which other types).

Furthermore, a default security policy may be applied to all virtualized execution environments 134 upon creation. The default security policy may initially allow each virtualized execution environment 134 access to only a limited set of resources, such as files included in one or more private directories allocated to the virtualized execution environment 134. The security policy generator 136 may generate a new security policy to include the access rules of the default security policy as well as the access rules from the selected blocks, as described above. The new security policy may be a CIL block generated by the security policy generator 136 that inherits the access rules from the default security policy block and the blocks selected above. Although depicted as executing on host machine 130, security policy generator 136 may be executed on a separate host from the virtualized execution environment 134 or any other computer system in communication with the virtualized execution environment 134.

Network 110 may be a public network (e.g. the internet), a private network (e.g. a local area network (LAN) or a wide area network (WAN)), or a combination thereof. In one example, network 110 may include a wired or a wireless infrastructure, which may be provided by one or more wireless communications systems, such as a wireless fidelity (WiFi) hotspot connected with the network 110 and/or a wireless carrier system that can be implemented using various data processing equipment, communication towers, etc.

Figure 2:
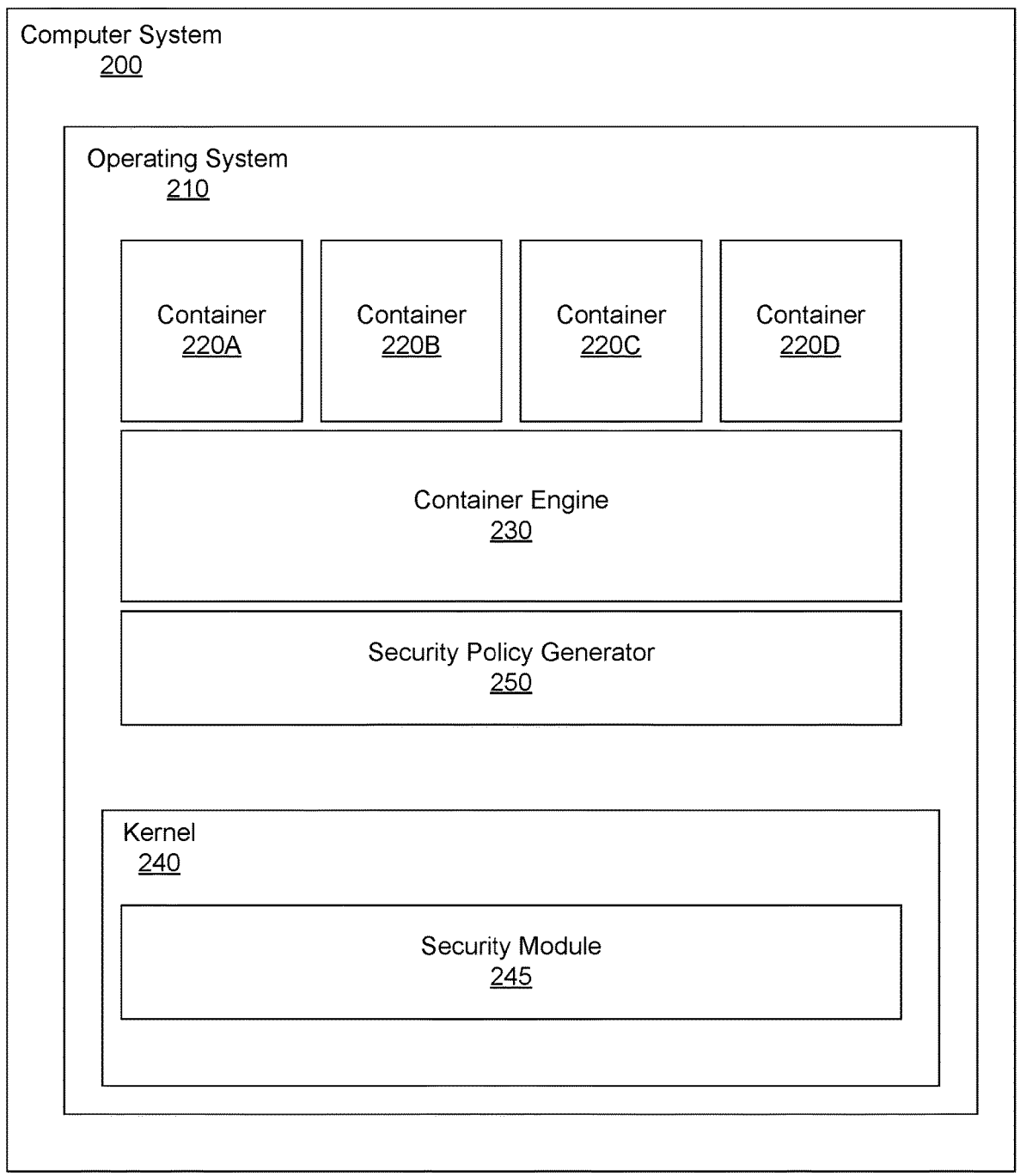
FIG. 2 depicts a block diagram of an example computer system executing a security policy generator, according to one implementation.

FIG. 2 depicts an illustrative example of a computer system 200, according to one implementation. Computer system 200 may be the same or similar to the host machine 130 as described in FIG. 1. Computer system 200 may be a bare metal machine or a virtual machine. Operating system 210 may run on computer system 200 and may execute one or more containers 220A-D, a container engine 230, a kernel 240, and a security policy generator 250. The kernel 240 may include a security module 245.

The containers 220A-D may each be a virtualized execution environment in which one or more applications, processes and computing resources are packaged together and isolated from other applications, processes, or resources of the computer system. A container 220A-D may execute applications by using the underlying resources of the operating system 210 on which it is running, in contrast to a virtual machine in which a virtual operating system may be required. The applications and processes executing inside a container 220A-D may only access the resources allocated to the container 220A-D.

A security policy may be associated with each of the containers 220A-D. A security policy may determine the computer system resources, such as filesystem objects, processes, and communication endpoints or networks which each container 220A-D is allowed to access. The security policy may comprise a set of access rules. The access rules may specify a role or user name and an object type (domain) identifier for objects or processes in the computer system. The access rules may also specify access and an access type of one object type to another. For example, a filesystem object may be assigned the type "object" and a process may be assigned the type "process." The access rules may then specify that all "process" types may access all "object" types as well as the type of access allowed, such as read, write, etc. If the security policy does not include an access rule explicitly specifying a first type to access a second type then the first type would not be allowed to access the second type (i.e. access is denied unless there is a specified rule allowing it). To enforce the security policy, when a process attempts to access a resource the security module 245 of the kernel 240 would determine if there is an access rule that specifies access by the process to the resource (e.g. the process's type is provided access to the resource's type). If access is specified by an access rule then the access would be allowed, otherwise access would be denied. Although the type attribute is described above as being used to define access rules, any label or attribute of system objects or processes may be used to specify access (e.g., user, role, etc.).

Containers 220A-D may themselves be isolated from one another or they may interact according to an applied security policy. The containers 220A-D may include processes that need to be accessed by applications and/or processes running within another container of the containers 220A-D. The security policy applied to each of the containers 220A-D may provide applications running within one container access to resources within other containers or applications executing within other containers. For example, a first container 220A may be provided access to a second container 220B while the second container 220B may not be provided access to the first container 220A. Thus, the security policy applied to each of the containers 220A-D may allow the containers 220A-D to interact in prescribed ways, or prevent the containers 220A-D from interacting at all.

Container engine 230 may be virtualization management software for creating and initializing containers 220A-D as well as managing operation of containers 220A-D. The container engine 230 may monitor and inspect containers 220A-D and generate metadata including descriptions of container resources, operation of containers, and other information associated with the containers 220A-D. The container engine 230 may generate the metadata in the form of a text file or other file that may be parsed by the security policy generator 250 (e.g., JSON, XML, CSV, etc.). Kernel 240 may manage container engine 230 and other processes executing on the operating system 210. Kernel 240 may be a Linux kernel or any other operating system kernel. Security policy generator 250 may generate a security policy for a container (e.g., SELinux security policy). Security module 245 (e.g., SELinux) of the kernel 240 may enforce the security policy by determining if there is an access rule providing access to a resource when a process running in a container 220A-D attempts to access the resource. For example, each process or resource may be given a label (e.g., a type label in SELinux). A security policy may specify that processes with a first label can access objects with a second label. When a process attempts to access an object, the security module 245 of the kernel 240 may determine whether the label of the process has been provided access to the label of the object. If the process label does not have access to the object's label then the security module 245 of the kernel 240 will deny access.

Security policy generator 250 may parse a metadata file generated by the container engine 230. The metadata file may include information about resources and operations of a container 220A-D. Parsing the metadata file may include retrieving information from the metadata file. The information may indicate computer system resources the container 220A-D is likely to access. For example, the information obtained from parsing the metadata file may include the objects on the system the container 220A-D is mounting, the TCP/UDP ports the container 220A-D is using, the processes or resources allocated to the container 220A-D, etc. Using the information obtained from the metadata, the security policy generator 250 may identify the resources that the container 220A-D is likely to access. The security policy generator 250 may identify a set of access rules to allow the container 220A-D to access the resources likely to be accessed. The security policy generator 250 may then generate a security policy including the identified set of access rules. In one example, the security policy generator 250 may generate a script in an SELinux CIL to define the security policy. The script may comprise a block in the CIL language. The security policy generator 250 may define the CIL block as inheriting the properties of one or more predefined CIL blocks. For example, the CIL block may include an element for each of the predefined CIL blocks signifying inheritance of the predefined CIL blocks. The CIL block may then comprise all properties from each of the predefined CIL blocks that it inherits. The properties of the predefined CIL blocks may comprise one or more access rules. The security policy generator 250 may select the predefined CIL blocks that include access rules that provide access to the resources the container 220A-D is likely to access. The security policy generator 250 may generate a CIL block that inherits, and therefore includes, all of the access rules from the selected predefined CIL blocks. The CIL block may then be compiled to generate the security policy.

In another example, a default security policy may be initially applied to container 220A when the container 220A is created. The default security policy may allow the container 220A to only access files included in one or more private directories allocated to the container. After the container is created, the container engine 230 may generate a metadata file identifying information about the container 220A, as described above. The security policy generator 250 may parse the metadata file and use the information to identify resources that the container 220A is likely to access. The security policy generator 250 may then search for and select a set of access rules that allow access to those identified resources. One or more sets of predefined access rules may be defined by a user of the system, included in the operating system kernel 240, or previously generated by the security policy generator 250. The security policy generator 250 may search through access rules, such as a database of predefined access rules, and select one or more of the predefined access rules to be included in the security policy. The security policy generator 250 may select the one or more predefined sets of access rules to provide access to resources that, according to the metadata, the container 220A is likely to access. A user may also select additional access rules to be included in the security policy. The security policy generator 250 may then create a security policy including the set of access rules derived from the metadata, the user selected access rules, the default security policy or any combination thereof. The security policy generator 250 may create the security policy by generating a script in a module language, kernel representation, or common intermediate language, (e.g. SELinux CIL), compiling the script and loading the security policy to the security module 245 of the kernel 240.

Figure 3:
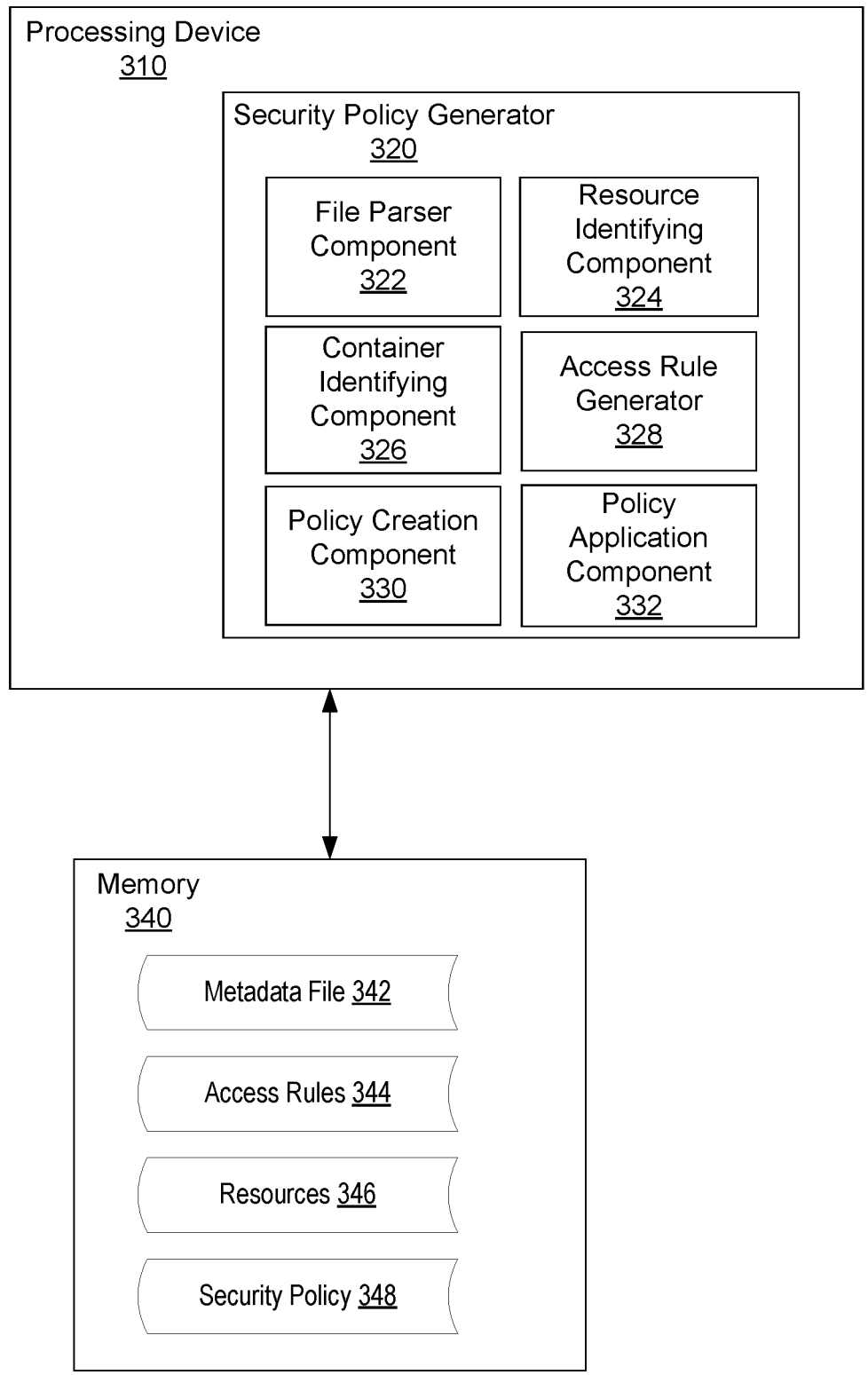
FIG. 3 depicts a system diagram of an example security policy generator according to one implementation.

FIG. 3 depicts a block diagram illustrating an example computer system 300 according to one implementation. Although the following description of FIG. 3 depicts a number of separate components, the functions performed by each component may be performed by any combination of one or more components. Thus, the designation of components is purely functional and each component may be implemented by a designated executable module or one or more of the components may be implemented by a single executable module.

System 300 may comprise a processing device 310 and a memory 340. Processing device 310 may execute a security policy generator 320 for generating a security policy for a virtualized execution environment. The virtualized execution environment may be a virtual machine or a container. The security policy generator 320 may comprise a file parser component 322, a resource identifying component 324, a container identifying component 326, an access rule generator 328, a policy creation component 330, and a policy application component 332.

File parser component 322 may parse a metadata file 342 corresponding to a virtualized execution environment. The metadata file 342 may be generated by a container engine after inspection of the virtualized execution environment. Parsing the metadata file 342 may include identifying information from the metadata file 342 that may indicate computer system resources that the virtualized execution environment is likely to access. The information may include the objects on the system the container is mounting, a network port allocated to the virtualized execution environment, etc. The resource identifying component 324 may identify, using the information obtained from the file parser component 322, the resources that the virtualized execution environment is likely to access.

Container identifying component 326 may identify a virtualized execution environment, such as a container, for which a security policy is to be created. The access rule generator 328 may generate access rules determining access to the resources identified by the resource identifying component 326 as likely to be accessed by the virtualized execution environment. The policy creation component 330 may create a security policy for the virtualized execution environment including the generated access rules and a default security policy. The policy creation component 330 may also receive input from a user to include in the generated security policy access rules selected by the user. The user may select additional access rules through a graphical user interface, a command prompt, or other user interface. Policy application component 332 may apply the generated security policy to the virtualized execution environment after it is generated. The policy application component 332 may also apply the policy to other virtualized execution environments. The security policy may be applied to the virtualized execution environment automatically by the security policy generator 320 or manually by a system administrator. In one example, applying the security policy by the policy application component 332 may comprise compiling the script defining the security policy. Once compiled, the container, and/or the processes and resources within the container may be given labels (such as type, group, etc.) according to the security policy. In another example, the container, processes, and resources may already be labeled and applying the security policy may comprise compiling the security policy script and loading it to an operating system kernel. The labels may associate the processes and resources of the container with access rules defined in the security policy. The access rules associated with the labels may then be enforced by an operating system kernel once the security policy is applied.

Memory 340 may store a metadata file 342, access rules 344, resources 346, and a security policy 348. Metadata file 342 may be a file comprising metadata associated with a virtualized execution environment. The metadata file 342 may be, for example, a JSON file, an XML file, a CSV file, etc. The metadata may comprise information indicating resources the virtualized execution environment is likely to access. The information may include the objects on the system that are mounting within the container namespace, the TCP/UDP ports the container is using, etc. The information may also include network access data, files the virtualized execution environment is mounting, etc. Access rules 344 may be rules of a mandatory access control system that identify resources that are allowed to be accessed by the virtualized execution environment. Resources 346 may include the computing resources available within a computer system. Resources 346 may include computer system resources such as file system objects, processes, or networks. Security policy 348 may be the security policy generated by the security policy generator 320. The security policy 348 may be applied to a virtualized execution environment and indicate the computer system resources that the virtualized execution environment is allowed to access. Applying the security policy may include replacing the default security policy with the newly created security policy. For example, the labels and associated access rules of the default security policy may be updated to comprise the labels and associated access rules of the new security policy. Applying the security policy may alternatively include applying the security policy to a virtualized execution environment that has no applied security policy. Applying the security policy may include loading the security policy to an operating system kernel which may enforce the security policy. The security policy may be applied automatically by the security policy generator 320 or manually by a system administrator.

Figure 4:
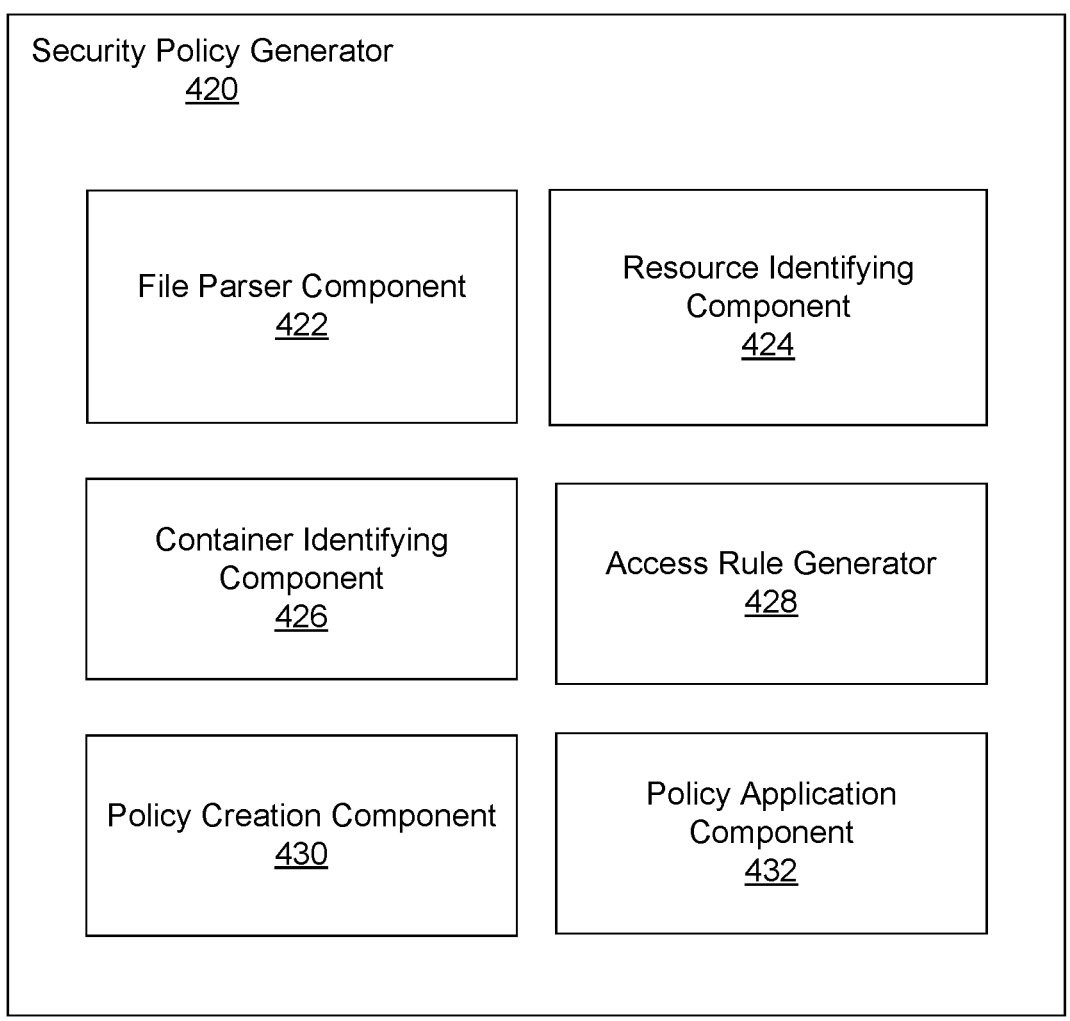
FIG. 4 depicts a component diagram of an example security policy generator according to one implementation.

FIG. 4 depicts a block diagram illustrating an example security policy generator 420. Although the following description of FIG. 3 depicts a number of separate components, the functions performed by each component may be performed by any combination of one or more of the components depicted or components not depicted. Thus, the designation of components is purely functional and each component may be implemented by a designated executable module or one or more of the components may be implemented by a single executable module.

The security policy generator 420 may include a file parser component 422, a resource identifying component 424, a container identifying component 426, an access rule generator 428, a policy creation component 430, and a policy application component 432.

File parser component 422 may parse a metadata file corresponding to a virtualized execution environment, such as a container. The metadata file may be generated by a container engine after inspection of the virtualized execution environment. The metadata file may be a JSON file or other text file. Parsing the metadata file may include extracting information from the text of the metadata file that indicates computer system resources likely to be accessed by the virtualized execution environment. Information extracted during parsing may include the objects on the system that are mounting the container, a directory the container is mounting, network access data, the resources allocated to the virtualized execution environment, etc. The information may also include a directory the virtualized execution environment is mounting, a network port allocated to the virtualized execution environment, the processes or resources allocated to the virtualized execution environment, etc. The resource identifying component 424 may identify, using the information obtained from the metadata file, the resources likely to be accessed by the virtualized execution environment.

Container identifying component 426 may identify a virtualized execution environment for which a security policy is to be created. The access rule generator 428 may generate access rules providing access to the resources that the resource identifying component 424 identifies as likely to be accessed by the virtualized execution environment. In one example, generating the access rules may comprise generating a script that specifies access to the identified resources (e.g., SELinux CIL blocks using type to type access definitions). In another example, generating the access rules may comprise identifying, using information extracted from the metadata file, predefined access rules (e.g., in the form of a CIL block) that specify access to the identified resources. For example, the access rule generator 428 may generate a list identifying each of the predefined access rules to be included in the security policy. The policy creation component 430 may create a security policy for the virtualized execution environment including the generated access rules and access rules of a default security policy. The policy creation component 430 may also receive input from a user to include in the generated security policy access rules selected by the user. The user may select additional access rules through a graphical user interface, a command prompt, or other user interface.

Finally, policy application component 432 may apply the generated security policy to the virtualized execution environment after the security policy is generated. The policy application component 432 may also apply the policy to other virtualized execution environments. The security policy may be applied automatically by the security policy generator 420 or manually by a system administrator. In one example, applying the security policy by the policy application component 432 may comprise compiling the script defining the security policy. Once compiled, the container, and/or the processes and resources within the container may be given labels (such as type, group, etc.) according to the security policy. In another example, the container, processes, and resources may already be labeled and applying the security policy may comprise compiling the security policy script and loading it to an operating system kernel. The labels may associate the processes and resources of the container with access rules defined in the security policy. The access rules associated with the labels may then be enforced by an operating system kernel once the security policy is applied.

Figure 5:
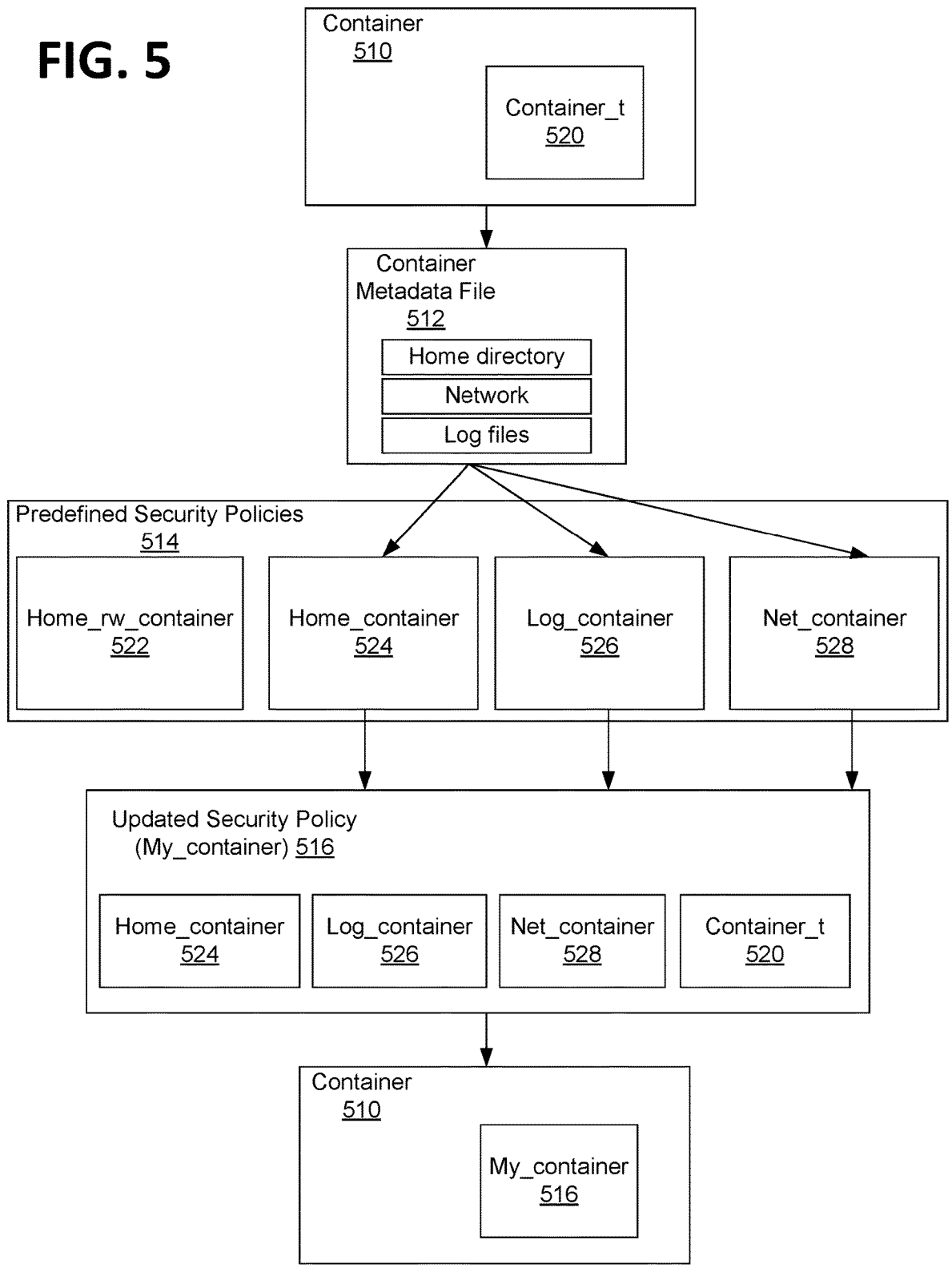
FIG. 5 depicts a block diagram of an example process flow for generating a security policy according to one implementation.

FIG. 5 depicts a block diagram illustrating a process flow for using a security policy generator to create a security policy for a container. Container 510 may include a default security policy, depicted as "Container_t" 520 in FIG. 5. Container metadata file 512 may be generated by a container engine which initializes and manages containers. Container metadata file 512 may include information associated with the container 510 (e.g., resources allocated to the container, network access data, mounted directories, etc.). Container metadata file 512 may include, for example, a "Home directory" the container is mounting, a "Network" to which the container may need access, and "Log files" the container may need to access, as depicted in FIG. 5.

Next, a security policy generator may parse the metadata file to identify resources likely to be accessed by the container. The security policy generator may then search through one or more predefined security policies 514 to identify one or more of the predefined security policies 514 that provides access to at least one of the resources likely to be accessed. The security policy generator may then select the predefined security policies, or access rules, that provide access to the resources to be included in an updated security policy 516. For example, the predefined security policies 514 may include "Home_rw_container" 522, "Home_container" 524, "Log_container" 526, and "Net_container" 528, as depicted in FIG. 5. Predefined security policies "Home_container" 524, "Log_container" 526, and "Net_container" 528 may be selected to be included in an updated security policy 516 for the container. "Home_container" 524, "Log_container" 526, and "Net_container" 528 may be selected because they specify access rules providing access to "Home directory," "Network," and "Log files" (i.e. the resources identified from the container metadata file 512).

The security policy generator may then merge the selected predefined security policies into an updated security policy 516 (e.g., "My_container" as in FIG. 5). Merging the selected security policies may comprise generating a script (e.g., in a module language or CIL) that defines the updated security policy 516 as inheriting the access rules from the selected security policies. For example, the updated security policy 516 may inherit the access rules from each of the predefined security policies included in the updated security policy 516. As shown in FIG. 5, the updated security policy ("My_container") 516 inherits the access rules from "Home_container," 524, "Log_container," 526, "Net_container" 528, and "Container_t" 520. The updated security policy 516 may then be applied to container 510 (e.g., "My_container"). The updated security policy 516 may be applied automatically by the security policy generator or manually by a system administrator. Once the generated security policy 516 is applied to container 510, container 510 may access Home directory, Network and Log files. For example, the security policy may be represented by a script that is compiled and then enforced by an operating system kernel. The script may indicate which computer system resources that applications and processes can access. The kernel may then prevent access to resources unless access is indicated by the compiled script.

Figure 6:
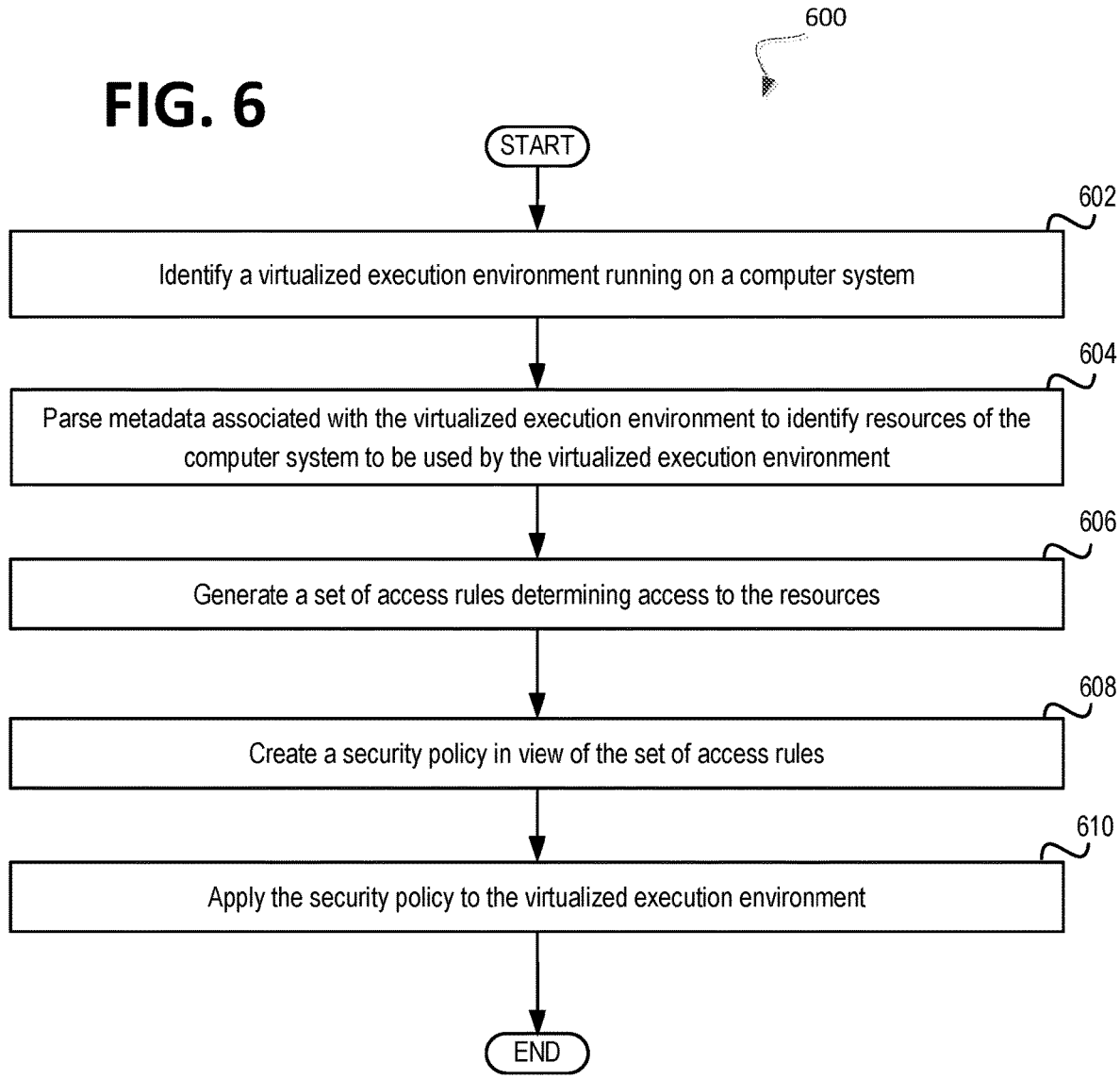
FIG. 6 depicts a flow diagram of an example method for generating a security policy for a virtualized execution environment according to one implementation.
Figure 7:
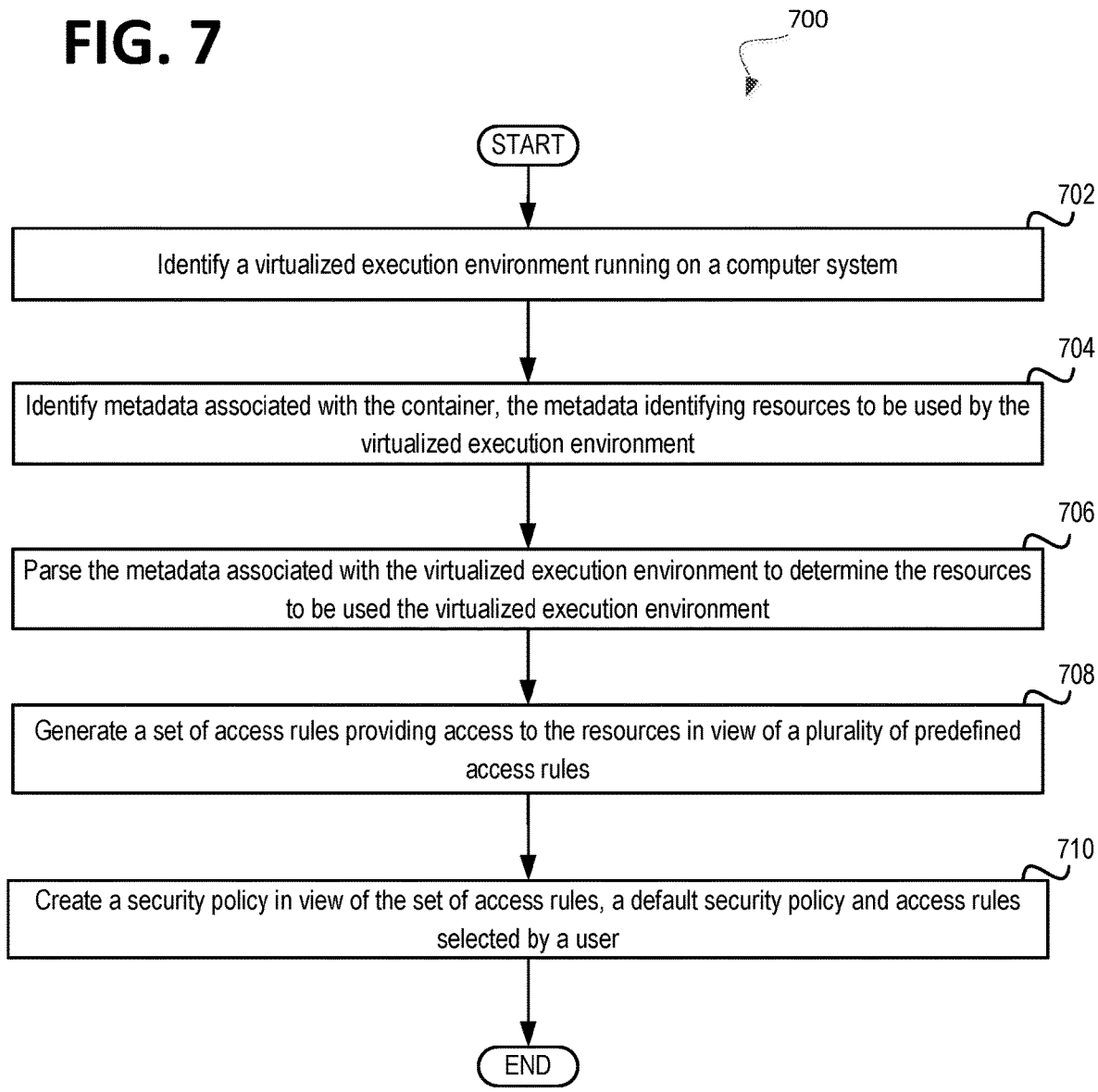
FIG. 7 depicts a flow diagram of an example method for generating a security policy for a virtualized execution environment according to another implementation.
Figure 8:
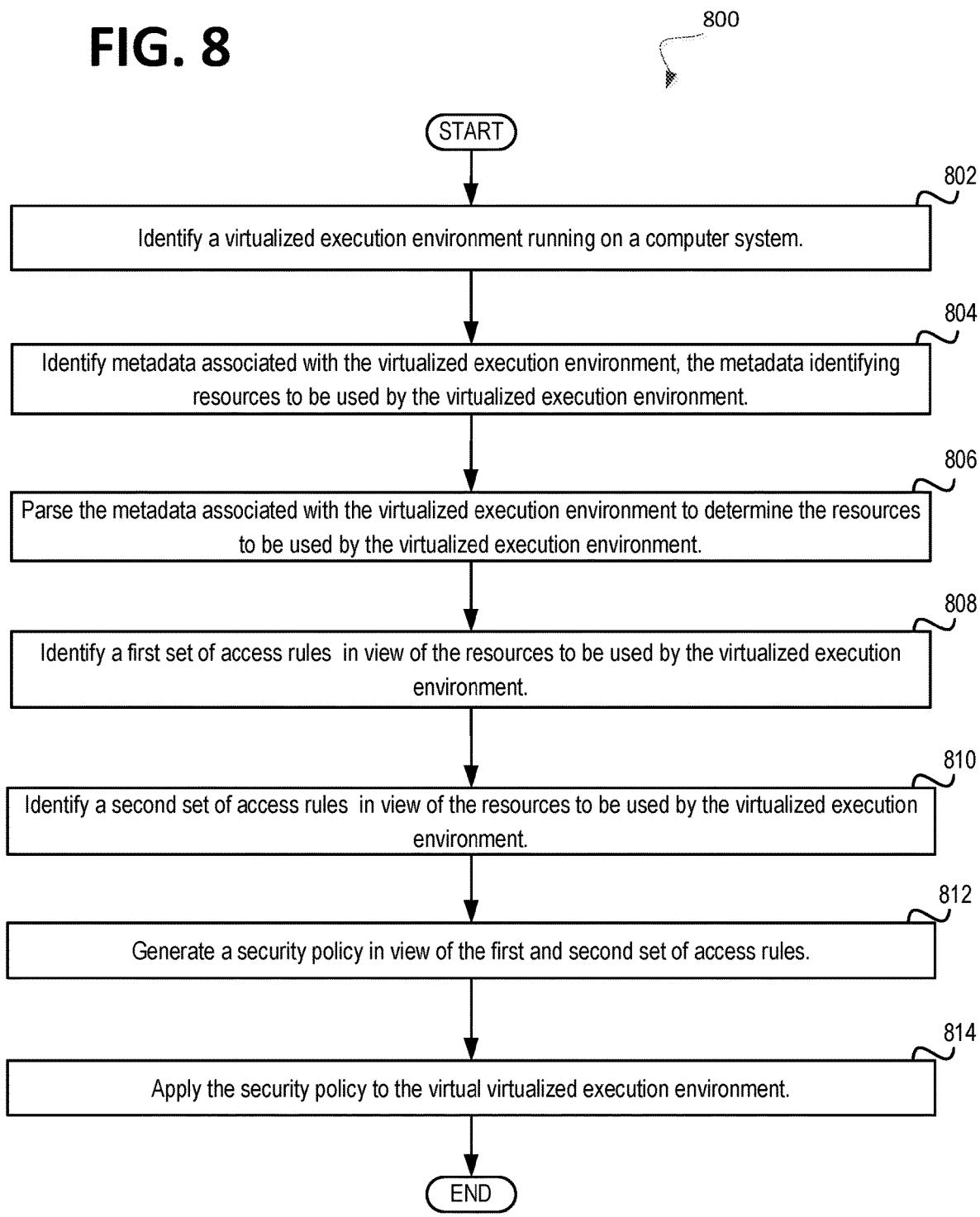
FIG. 8 depicts a flow diagram of an example method for generating a security policy for a virtualized execution environment according to another implementation.

FIGS. 6, 7 and 8 depict flow diagrams for illustrative example methods 600, 700, and 800 for generating a security policy for a virtualized execution environment. Method 600 illustrates an example process flow for generating and applying a security policy for a virtualized execution environment. Method 700 illustrates an example process flow for generating a security policy for a virtualized execution environment in view of a plurality of predefined access rules. Method 800 illustrates an example process flow for generating a security policy for a virtualized execution environment from two sets of access rules. Methods 600, 700, and 800 may be performed by processing logic that may comprise hardware (e.g., processing device, circuitry, dedicated logic, programmable logic, microcode, etc.), software (e.g., instructions run or executed on a processing device), or a combination thereof. In some embodiments, methods 600, 700, and 800 may be carried out by security policy generator 136 of FIG. 1.

For simplicity of explanation, the methods of this disclosure are depicted and described in a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, the methods disclosed in this specification are capable of being stored on an article of manufacture to facilitate transporting and transferring such methods to computing devices. The term "article of manufacture," as used herein, is intended to encompass a computer program accessible from any computer-readable storage device or memory page media.

Referring to FIG. 6, method 600 may be performed by a processing device of a computer system. At block 602, a security policy generator may identify a virtualized execution environment running on a computer system. The virtualized execution environment may be a container, a virtual machine, or any other virtualization of computer resources. Identifying the virtualized execution environment may include selection of the virtualized execution environment by a user of the computer system. Identifying the virtualized execution environment may also include automatically identifying, by the security policy generator, a virtualized execution environment that may need an updated security policy.

At block 604, the security policy generator may parse metadata associated with the identified virtualized execution environment to identify resources of the computer system likely to be accessed by the virtualized execution environment. A container engine may generate a metadata file containing the metadata after inspecting the virtualized execution environment. Inspecting the virtualized execution environment may comprise monitoring the virtualized execution environment and obtaining information about the virtualized execution environment's operation, source code, etc. The metadata file may be a JSON file, an XML file, a CSV file, and so forth. The metadata may include network access data, a directory the virtualized execution environment is mounting, TCP/UDP ports the virtualized execution environment is using, etc.

At block 606, the security policy generator may generate a set of access rules providing access to the resources identified at block 604. The access rules may determine the processes, objects, or other computer system resources that the virtualized execution environment may access. For example, in SELinux the syntax for allowing every process labeled httpd_t to read files labeled http_var_log_t may be (allow httpd_t http_var_log_t: file read;) Thus, the syntax for an allow access rule may be generalized as [allow "label of process" "label of resource":"type of resource" "type of access"]. The set of access rules may be generated by combining one or more predefined sets of access rules together. The predefined access rules may be selected to provide access to the resources identified at block 604. In one example, the access rules may comprise a script in an SELinux common intermediate language that explicitly provides the virtualized execution environment and processes of the virtualized execution environment with access to specified resources.

At block 608, the security policy generator may create a security policy including the set of access rules generated at block 606. The security policy may be an SELinux security policy, or any other such security policy that may be applied to a virtualized execution environment. In one example, the security policy generator may generate a script in an SELinux CIL to define the security policy. The script may comprise a block in the CIL language. The security policy generator may define the CIL block as inheriting the properties of one or more predefined CIL blocks. The CIL blocks may be predefined by a system administrator, the security policy generator, or the operating system kernel. Each of the predefined CIL blocks may comprise one or more access rules. The security policy generator may select the predefined CIL blocks that include access rules that provide access to the resources the virtualized execution environment is likely to access. Therefore, the security policy generator may generate a CIL block that inherits, and therefore includes, all of the access rules from the selected predefined CIL blocks. The CIL block may then be compiled to generate the security policy. The security policy may be enforced by an operating system kernel and/or a security engine (e.g., SELinux security engine) that interprets the security policy and restricts access to computer system resources according to the security policy. The security policy may prevent access to resources unless access is specified by the security policy.

At block 610, the security policy generator may apply the security policy to the virtualized execution environment. Applying the security policy created at block 608 may include updating a default security policy of the virtualized execution environment to include the set of access rules generated at block 606. The default security policy may be a security policy that is applied to all virtualized execution environments upon creation and which allows access to only a limited set of resources, such as a private directory allocated to the virtualized execution environment. Applying the security policy may also include replacing the default security policy with the newly created security policy, or applying the security policy to a virtualized execution environment that has no applied security policy. Once the security policy is applied, the virtualized execution environment may have access only to the resources defined by the security policy. In one example, applying the security policy may comprise compiling the script defining the security policy. Once compiled, the virtualized execution environment, and/or the processes and resources within the virtualized execution environment may be given labels (such as type, group, etc.) according to the security policy. In another example, the virtualized execution environment, processes, and resources may already be labeled and applying the security policy may comprise compiling the security policy script and loading it to an operating system kernel. The labels may associate the processes and resources of the virtualized execution environment with access rules defined in the security policy. The access rules associated with the labels may then be enforced by an operating system kernel once the security policy is applied. The security policy may be also be applied manually by a system administrator, for example by assigning a label to the virtualized execution environment that associates it with the security policy.

Referring to FIG. 7, method 700 may be performed by the processing device of a computer system. At block 702, a security policy generator may identify a virtualized execution environment running on a computer system. The virtualized execution environment may be a container, a virtual machine, or any other virtualization of computer resources. Identifying the virtualized execution environment may include selection of the virtualized execution environment by a user of the computer system. Identifying the virtualized execution environment may also include automatically identifying a virtualized execution environment that may need an updated security policy.

At block 704, the security policy generator may identify metadata associated with the virtualized execution environment. The metadata may include the objects on the system mounting within the virtualized execution environment, the TCP/UDP ports the virtualized execution environment is using, etc. The metadata may additionally identify resources allocated to the virtualized execution environment. The metadata may be contained in a JSON file, XML file, or other text file, associated with the virtualized execution environment. The metadata may be generated by a container engine that initializes and manages virtualized execution environments. The metadata may also be generated by any component of the computer system having access to the virtualized execution environment.

At block 706, the security policy generator may parse the metadata associated with the virtualized execution environment to determine the resources likely to be used by the virtualized execution environment. The resources identified from the metadata may be processes, objects, files, directories, network ports, or other resources of the computer system that the virtualized execution environment is likely to access. Parsing the metadata may comprise parsing and filtering the text of the metadata file to identify information relevant to determining resources likely to be accessed by the virtualized execution environment.

At block 708, the security policy generator may generate a set of access rules providing access to the resources allocated to the virtualized execution environment. The security policy generator may select one or more predefined of access rules to generate the set of access rules. To select the predefined access rules, the security policy generator may search through a number of sets of access rules to identify predefined access rules that provide access to the resources likely to be accessed by the virtualized execution environment. The set of access rules may be generated by combining one or more of the predefined access rules together. In one example, the security policy generator may generate a script in a high level module language, a common intermediate language (CIL), or a low-level kernel policy language to define the security policy. The script may comprise a block of policy definitions in the CIL or other language. The security policy generator may define the block as inheriting the properties of one or more predefined blocks. The predefined blocks may be previously defined by a system administrator, the security policy generator, a security policy engine, or the kernel, to provide access to particular resources. Each of the predefined blocks may comprise one or more access rules. The security policy generator may select predefined blocks comprising access rules that provide access to the resources the virtualized execution environment is likely to access. Therefore, the security policy generator may generate a block of access rules that inherits, and therefore includes, all of the access rules from the selected predefined blocks.

At block 710, the security policy generator may create a security policy comprised of the set of access rules, a default security policy, and any additional access rules selected by a user. The default security policy may be a security policy that is applied to the virtualized execution environment upon its creation. A user may select the additional access rules through a graphical user interface, a command prompt or other user interface. The set of access rules, the default security policy and the additional access rules selected by a user may be merged together into a single security policy allowing access to the resources allowed by each of the access rules, default security policy, and the additional access rules. For example, the security policy generator may edit the script generated for the set of access rules at block 708 to inherit the access rules from the default security policy. Additionally, the script may be edited to include the additional access rules selected by the user. Finally, the script may be compiled and loaded to an operating system kernel to be enforced.

At block 712, the security policy generator may apply the security policy to the virtualized execution environment. Applying the security policy may include updating the default security policy to include the set of access rules generated at block 708. Applying the security policy may also include replacing the default security policy with the newly created security policy. Applying the security policy may alternatively include applying the security policy to a virtualized execution environment that has no applied security policy. In one example, applying the security policy may comprise compiling the script defining the security policy. Once compiled, the virtualized execution environment, and/or the processes and resources within the virtualized execution environment may be given labels (such as type, group, etc.) according to the security policy. In another example, the virtualized execution environment, processes, and resources may already be labeled and applying the security policy may comprise compiling the security policy script and loading it to an operating system kernel. The labels may associate the processes and resources of the virtualized execution environment with access rules defined in the security policy. The access rules associated with the labels may then be enforced by an operating system kernel once the security policy is applied. The security policy may be also be applied manually by a system administrator, for example by assigning a label to the virtualized execution environment that associates the virtualized execution environment with the security policy. Once the security policy is applied, the virtualized execution environment may have access only to the resources defined by the security policy. The security policy may be enforced by the operating system kernel and/or a security engine that interprets the security policy and restricts access to computer system resources according to the security policy.

Referring to FIG. 8, method 800 may be performed by a processing device of a computer system. At block 802, a security policy generator may identify a virtualized execution environment running on a computer system. The virtualized execution environment may be a container, a virtual machine, or any other virtualization of computer resources. Identifying the virtualized execution environment may include selection of the virtualized execution environment by a user of the computer system. Identifying the virtualized execution environment may also include automatically identifying a virtualized execution environment that may need an updated security policy.

At block 804, the security policy generator may identify metadata associated with the virtualized execution environment. The metadata may include file systems, directories, TCP sockets, network interfaces, etc. The metadata may be contained in a JSON file, CSV file, XML file, etc. that is associated with the virtualized execution environment. The metadata may be generated by a container engine that initializes and manages virtualized execution environments. The metadata may also be generated by any component of the computer system having access to the virtualized execution environment.

At block 806, the security policy generator may parse the metadata associated with the virtualized execution environment to determine the resources allocated to, or to be used by, the virtualized execution environment. Parsing the metadata may comprise parsing and filtering the text of the metadata file to identify information relevant to determining resources likely to be accessed by the virtualized execution environment. The resources identified from the metadata may be computer system processes, objects, or other resources of the computer system that the virtualized execution environment may need access to, or is likely to access.

At block 808, the security policy generator may identify a first set of access rules providing access to a subset of the resources to be used by the virtualized execution environment. The first set of access rules may be selected from one or more predefined sets of access rules. To select the predefined access rules, the security policy generator may search through a number of sets of access rules to identify predefined access rules that provide access to the resources likely to be accessed by the virtualized execution environment. The first set of access rules may provide the virtualized execution environment access to a first set of computer system resources.

At block 810, the security policy generator may identify a second set of access rules providing access to a subset of the resources to be used by the virtualized execution environment. The second set of access rules may be selected from one or more predefined sets of access rules. To select the predefined access rules, the security policy generator may search through a number of sets of access rules to identify predefined access rules that provide access to the resources likely to be accessed by the virtualized execution environment. The second set of access rules may provide the virtualized execution environment access to a second set of computer system resources. The second set of computer system resources may be completely different from the first set of computer system resources. Alternatively, the second set of computer system resources may overlap with the first set of computer system resources. Additionally, the predefined sets of access rules may each be a predefined security policy.

At block 812, the security policy generator may generate a security policy including the first and second set of access rules. Generating the security policy may comprise merging the first and second set of access rules into a merged set of access rules. The merged set of access rules may provide the virtualized execution environment access to the first set and second set of computer system resources. For example, the security policy generator may merge the first and second sets of access rules by generating a script in a language, such as CIL, that defines the merged set of access rules as inheriting the access rules from the first and second sets of access rules. The first and second sets of access rules may be previously defined by a system administrator, the security policy generator, a security policy engine, or the kernel, to provide access to particular resources. The security policy may be defined as inheriting the access rules of a first security policy defined by the first set of access rules and a second security policy defined by the second set of access rules. In addition, generating the security policy may comprise identifying access rules selected by a user and merging the selected access rules with the first and second sets of access rules. The user may select additional access rules through a graphical user interface, a command prompt, or other user interface. For example, the security policy generator may edit the script generated for the merged set of access rules to inherit the access rules from the default security policy. Additionally, the script may be edited to include the additional access rules selected by the user. Finally, the script may be compiled and loaded to an operating system kernel to be enforced.

At block 814, the security policy generator may apply the security policy to the virtualized execution environment. Applying the security policy may include updating the default security policy to include the set of access rules generated at block 708. Applying the security policy may also include replacing the default security policy with the newly created security policy. Applying the security policy may alternatively include applying the security policy to a virtualized execution environment that has no applied security policy. The security policy may be applied automatically by the security policy generator or manually by a system administrator. In one example, applying the security policy may comprise compiling the script defining the security policy. Once compiled, the virtualized execution environment, and/or the processes and resources within the virtualized execution environment may be given labels (such as type, group, etc.) according to the security policy. In another example, the virtualized execution environment, processes, and resources may already be labeled and applying the security policy may comprise compiling the security policy script and loading it to an operating system kernel. The labels may associate the processes and resources of the virtualized execution environment with access rules defined in the security policy. The access rules associated with the labels may then be enforced by an operating system kernel once the security policy is applied. The security policy may be also be applied manually by a system administrator, for example by assigning a label to the virtualized execution environment that associates the virtualized execution environment with the security policy. Once the security policy is applied, the virtualized execution environment may have access only to the resources defined by the security policy. The security policy may be enforced by a security engine that interprets the security policy and restricts access to computer system resources according to the security policy.

Figure 9:
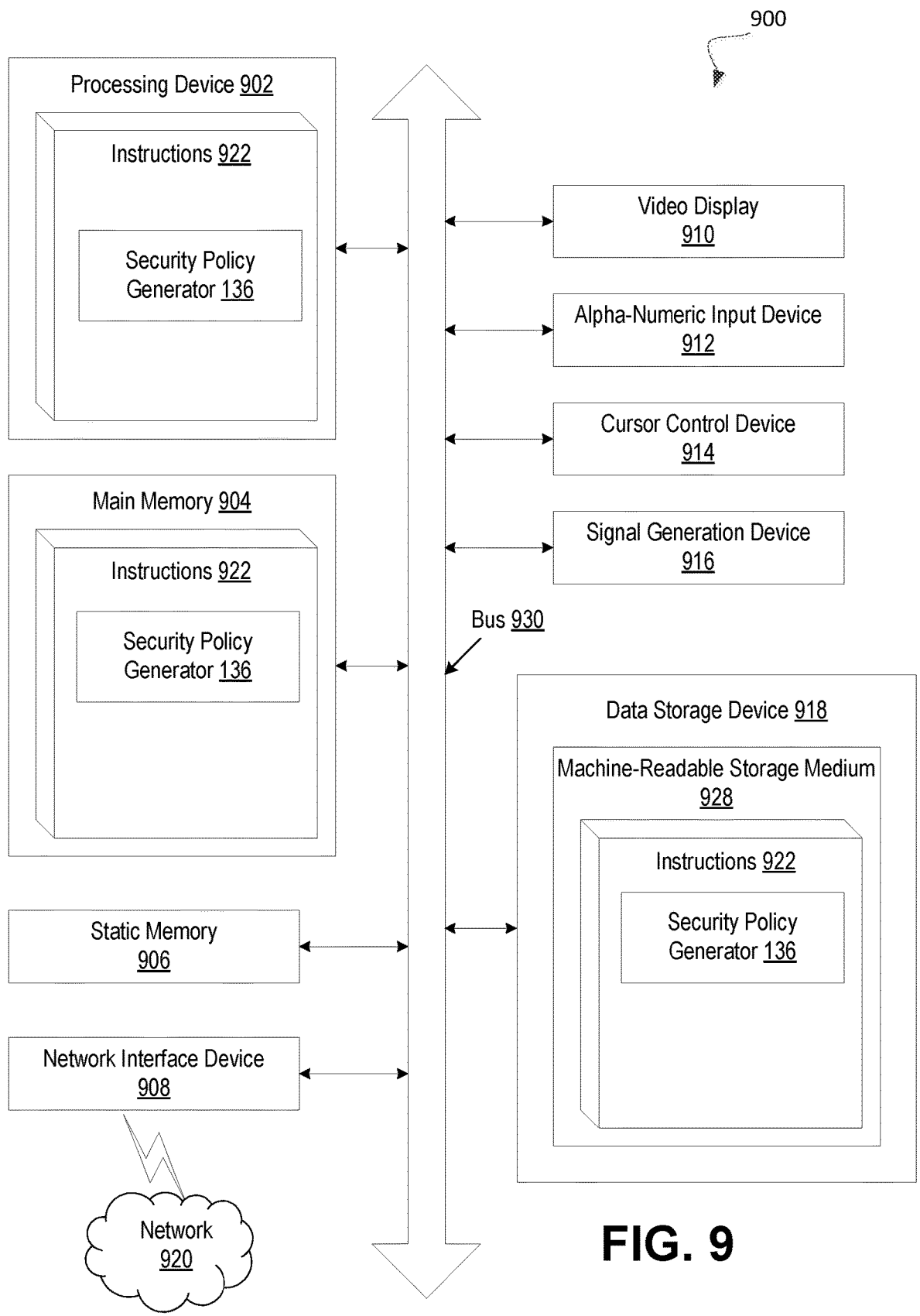
FIG. 9 depicts a block diagram of an illustrative computer system operating in accordance with one implementation.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or DRAM (RDRAM), etc.), a static memory 906 (e.g., flash memory, static random access memory (SRAM), etc.), and a data storage device 918, which communicate with each other via a bus 930. The processing device 902 may be operatively coupled with the main memory 904, static memory 906, and/or the data storage device 918.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may execute instructions 922 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium 928 (also known as a computer-readable medium) on which is stored one or more sets of instructions or software 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting machine-readable storage media.

In one implementation, the instructions 922 include instructions for security policy generator (e.g., security policy generator 136 of FIG. 1) and/or a software library containing methods that call a security policy generator. While the machine-readable storage medium 928 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Other computer system designs and configurations may also be suitable to implement the system and methods described herein. The following examples illustrate various implementations in accordance with one or more aspects of the present disclosure.

Example 1 is a method comprising identifying a virtualized execution environment running on a computer system, parsing metadata associated with the virtualized execution environment to identify resources of the computer system to be used by the virtualized execution environment; generating a set of access rules determining access to the resources; creating a security policy in view of the set of access rules; and applying the security policy to the virtualized execution environment.

Example 2 is the method of example 1, wherein the metadata comprises at least one of: a filesystem object or a communication endpoint.

Example 3 is the method of example 1, wherein the virtualized execution environment comprises a container, and wherein parsing the metadata comprises: identifying a metadata file associated with the container; and identifying, in view of the metadata, resources of the computer system to be used by the container.

Example 4 is the method of example 1, wherein the metadata is stored in a JSON file.

Example 5 is the method of example 1, wherein generating the set of access rules comprises: identifying one or more predefined sets of access rules in view of the resources; and receiving an input from a user defining one or more access rules, wherein the one or more access rules defined by the input from the user and the one or more predefined sets of access rules are included in the set of access rules.

Example 6 is the method of example 1, wherein creating the security policy comprises merging the set of access rules with a default security policy of the virtualized execution environment.

Example 7 is the method of example 6, wherein merging the set of access rules with the default security policy comprises defining the security policy as inheriting resource access allowed by both the set of access rules and the default security policy.

Example 8 is a system comprising: a memory; and a processor, operatively coupled to the memory, the processor to: identify a virtualized execution environment running on a computer system; identify metadata associated with the virtualized execution environment, wherein the metadata identifies resources to be used by the virtualized execution environment; parse the metadata associated with the virtualized execution environment to determine resources to be used by the virtualized execution environment; generate a set of access rules providing access to the resources in view of a plurality of predefined access rules; and create a security policy in view of the set of access rules.

Example 9 is the system of example 8, wherein the metadata associated with the virtualized execution environment comprises a JSON file.

Example 10 is the system of example 8, wherein the security policy is defined as inheriting resource access rules from the set of access rules and a default security policy.

Example 11 is the system of example 8, wherein the resources to be used by the virtualized execution environment comprise a directory to which the virtualized execution environment is mounted or a network to be accessed.

Example 12 is the system of example 8, wherein parsing the metadata comprises: identifying a metadata file associated with the virtualized execution environment, wherein the metadata file is generated by a container engine that generates and manages the virtualized execution environment; and determining, in view of the metadata, computer system resources to which the virtualized execution environment requires access.

Example 13 is the system of example 12, wherein the virtualized execution environment comprises a container.

Example 14 is the system of example 8, further comprising applying the security policy to the virtualized execution environment.

Example 15 is a non-transitory machine-readable storage medium including instructions that, when accessed by a processing device, cause the processing device to: identify a virtualized execution environment running on a computer system; identify metadata associated with the virtualized execution environment, wherein the metadata identifies resources to be used by the virtualized execution environment; parse the metadata associated with the virtualized execution environment to determine the resources to be used by the virtualized execution environment; identify a first set of access rules in view of the resources to be used by the virtualized execution environment; identify a second set of access rules in view of the resources to be used by the virtualized execution environment; generate a security policy in view of the first and second sets of access rules; and apply the security policy to the virtualized execution environment.

Example 16 is the storage medium of example 15, wherein the metadata comprises at least one of: a filesystem object or a communication endpoint.

Example 17 is the storage medium of example 15, wherein the virtualized execution environment comprises a container, and wherein parsing the metadata comprises: identifying a metadata file associated with the container, wherein the metadata file is generated by a container engine that generates and manages the container; and determining, in view of the metadata, computer system resources to which the container requires access.

Example 18 is the storage medium of example 15, wherein the security policy is defined as inheriting resource access rules from the first and second sets of access rules.

Example 19 is the storage medium of example 15, wherein the metadata is comprised by a JSON file.

Example 20 is the storage medium of example 15, wherein generating the security policy comprises merging the first set of access rules, the second set of access rules, and one or more access rules selected by a user.

Example 21 is a method comprising: identifying a container executing in a computing environment, wherein a first security policy is associated with the container; parsing information associated with the container to determine resources of the computing environment to be used by the container; identifying a second security policy in view of the resources to be used by the container, wherein the second security policy provides access to resources of the computing environment not allowed by the first security policy; creating a third security policy in view of the first and second security policies; and applying the third security policy to the container.

Example 22 is the method of example 21, wherein the information identifies network access information and information indicating files of the computing environment that the container is mounting to a container space.

Example 23 is the method of example 21 further comprising applying the third security policy to a second container, wherein the second container is to access the same resources used by the container.

Example 24 is the method of example 21, wherein parsing information associated with the virtualized container comprises parsing a JSON file, the JSON file being created by a container engine, and wherein the second security policy is predefined.

Example 25 is the method of example 21, wherein the first and second security policies are predefined and indicate resources that the container is allowed to access, and wherein the resources comprise one or more of processes, files, directories, and system objects of the computing environment.

Example 26 is the method of example 25, wherein creating the third security policy comprises merging the second security policy with the first security policy of the container.

Example 27 is the method of example 26, wherein merging the second and first security policies comprises defining the third security policy as inheriting resource access allowed by both the first and second security policies.

Example 28 is a system comprising: a memory; and a processor, operatively coupled to the memory, the processor to: identify information associated with a container; parse the information to determine resources to be used by the container; identify a first security policy in view of the resources to be used by the container; identify a second security policy in view of the resources to be used by the container; create a third security policy in view of the first and second security policies.

Example 29 is the system of example 28, wherein the first and second security policies comprise predetermined resource access rules, and wherein the third security policy inherits the resource access rules of both the first and second security policies.

Example 30 is an apparatus comprising: a means for identifying a virtualized execution environment running on a computer system; a means for parsing metadata associated with the virtualized execution environment to identify resources of the computer system to be used by the virtualized execution environment; a means for generating a set of access rules providing access to the resources; and a means for creating a security policy in view of the set of access rules.

Example 31 is the apparatus of example 30, further comprising a means for applying the security policy to the virtualized execution environment.

Example 32 is a system comprising: memory; and a processing device operatively coupled to the memory, the processing device to implement the subject matter of any of examples 1-31.

Example 33 is a non-transitory machine-readable storage medium including instructions that, when accessed by a processing device, cause the processing device to implement the subject matter of any of examples 1-31.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems may appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   identifying a virtualized execution environment comprising a container running on a computer system;
   generating, for the container, metadata comprising description of container resources and operation of the container;
   parsing the metadata to identify resources of the computer system to be used by the virtualized execution environment;
   generating, based on the identified resources, a set of access rules determining access to the resources of the computer system;
   creating a security policy in view of the set of access rules; and
   applying the security policy to the virtualized execution environment.

2. The method of claim 1, wherein the metadata comprises an identifier of at least one of: a filesystem object or a communication endpoint.

3. The method of claim 1, wherein parsing the metadata comprises:
   identifying a metadata file associated with the container; and
   identifying, in view of the metadata, resources of the computer system to be used by the container.

4. The method of claim 1, wherein the metadata is stored in a JavaScript Object Notation file.

5. The method of claim 1, wherein generating the set of access rules comprises:
   identifying a predefined set of access rules associated with the resources of the computer system; and
   merging the set of access rules with the predefined set of access rules.

6. The method of claim 1, wherein creating the security policy comprises merging the set of access rules with a default security policy of the virtualized execution environment.

7. The method of claim 6, wherein merging the set of access rules with the default security policy comprises defining the security policy as inheriting resource access allowed by both the set of access rules and the default security policy.

8. A system comprising:
   a memory; and
   a processor, operatively coupled to the memory, the processor to:
   identify a virtualized execution environment comprising a container running on a computer system;
   generate for the container, metadata comprising description of container resources and operation of container;
   identify the metadata associated with the virtualized execution environment, wherein the metadata identifies resources to be used by the virtualized execution environment;
   parse the metadata to determine resources of the computer system to be used by the virtualized execution environment;
   generate, based on the identified resources, a set of access rules providing access to the resources in view of a plurality of predefined access rules; and
   create a security policy in view of the set of access rules.

9. The system of claim 8, wherein the metadata associated with the virtualized execution environment comprises a JavaScript Object Notation file.

10. The system of claim 8 wherein the security policy is defined as inheriting resource access rules from the set of access rules and a default security policy.

11. The system of claim 8 wherein the resources to be used by the virtualized execution environment comprise a directory to which the virtualized execution environment is mounted or a network to be accessed.

12. The system of claim 8, wherein parsing the metadata comprises:
    identifying a metadata file associated with the virtualized execution environment, wherein the metadata file is generated by a container engine that generates and manages the virtualized execution environment; and
    determining, in view of the metadata, computer system resources to which the virtualized execution environment requires access.

13. The system of claim 8, further comprising applying the security policy to the virtualized execution environment.

14. A non-transitory machine-readable storage medium including instructions that, when accessed by a processing device, cause the processing device to:
    identify a virtualized execution environment comprising a container running on a computer system;
    generate for the container, metadata comprising description of container resources and operation of the container;
    identify the metadata associated with the virtualized execution environment, wherein the metadata identifies resources of the computer system to be used by the virtualized execution environment;

parse the metadata to determine the resources to be used by the virtualized execution environment;

identify a first set of access rules in view of the resources of the computer system to be used by the virtualized execution environment;

identify a second set of access rules in view of the resources of the computer system to be used by the virtualized execution environment;

generate, based on the identified resources, a security policy in view of the first and second sets of access rules; and apply the security policy to the virtualized execution environment.

15. The storage medium of claim 14, wherein the metadata comprises at least one of: a filesystem object or a communication endpoint.

16. The storage medium of claim 14, wherein parsing the metadata comprises:

identifying a metadata file associated with the container, wherein the metadata file is generated by a container engine that generates and manages the container; and determining, in view of the metadata, computer system resources to which the container requires access.

17. The storage medium of claim 14, wherein the security policy is defined as inheriting resource access rules from the first and second sets of access rules.

18. The storage medium of claim 14, wherein the metadata is comprised by a JavaScript Object Notation file.

19. The storage medium of claim 14, wherein generating the security policy comprises merging the first set of access rules, the second set of access rules, and one or more access rules selected by a user.

* * * * *